US009541812B2

(12) United States Patent
Yoo et al.

(10) Patent No.: US 9,541,812 B2
(45) Date of Patent: Jan. 10, 2017

(54) ELECTROPHORETIC PARTICLES, PRODUCTION METHODS OF ELECTROPHORETIC PARTICLES, AND ELECTROPHORETIC DISPLAY DEVICES

(75) Inventors: Hyeon-Jung Yoo, Yongin-si (KR); Young-Seo Yoon, Seoul (KR); Hey-Jin Myoung, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 377 days.

(21) Appl. No.: 14/369,064

(22) PCT Filed: Mar. 30, 2012

(86) PCT No.: PCT/KR2012/002399
§ 371 (c)(1),
(2), (4) Date: Jan. 9, 2015

(87) PCT Pub. No.: WO2013/100263
PCT Pub. Date: Jul. 4, 2013

(65) Prior Publication Data
US 2015/0109659 A1 Apr. 23, 2015

(30) Foreign Application Priority Data

Dec. 26, 2011 (KR) .................. 10-2011-0142732

(51) Int. Cl.
*G02F 1/167* (2006.01)
(52) U.S. Cl.
CPC ....... *G02F 1/167* (2013.01); *G02F 2001/1678* (2013.01)
(58) Field of Classification Search
CPC .... G02F 1/167; G02F 2001/1678; G02F 1/01; G02F 1/13439; C08K 9/10; C08K 9/00

USPC ........ 359/296, 253–254, 245, 290–291, 298; 349/33; 345/49, 105, 107; 430/31–32; 523/205, 200, 206, 207, 208
See application file for complete search history.

(56) References Cited

U.S. PATENT DOCUMENTS

| | | | | |
|---|---|---|---|---|
| 6,765,713 | B2 * | 7/2004 | Yanagisawa | ......... C09D 5/4411 359/296 |
| 2004/0176498 | A1 | 9/2004 | Ando et al. | |
| 2006/0198422 | A1 | 9/2006 | Chopra et al. | |
| 2008/0016493 | A1 | 1/2008 | Pouchak et al. | |
| 2008/0291526 | A1 | 11/2008 | Lin et al. | |
| 2010/0090178 | A1 * | 4/2010 | Kosowsky | ............... H01C 7/10 252/513 |

(Continued)

FOREIGN PATENT DOCUMENTS

| | | |
|---|---|---|
| CN | 101075057 A | 11/2007 |
| CN | 101311807 A | 11/2008 |

(Continued)

OTHER PUBLICATIONS

International Searching Authority, International Search Report for PCT/KR2012/002399 dated Nov. 29, 2012.

*Primary Examiner* — Scott J Sugarman
*Assistant Examiner* — Kristina Deherrera
(74) *Attorney, Agent, or Firm* — Sughrue Mion, PLLC

(57) ABSTRACT

The present invention relates to an electrophoretic particle that includes: a core part including an inorganic particle; a shell layer formed on the core part; and a protective layer formed on the shell layer, a method of producing the electrophoretic particle, and an electrophoretic display device including the electrophoretic particle.

16 Claims, 5 Drawing Sheets

(56) References Cited

U.S. PATENT DOCUMENTS

2010/0207868 A1* 8/2010 Konno ................ G09G 3/344
345/107

FOREIGN PATENT DOCUMENTS

| CN | 101575463 A | 11/2009 |
|---|---|---|
| JP | 2004-269558 A | 9/2004 |
| JP | 2008-293017 A | 12/2008 |
| JP | 2011-153215 A | 8/2011 |
| KR | 10-2004-0019019 A | 3/2004 |
| KR | 10-2006-0066481 A | 6/2006 |
| KR | 10-0655918 B1 | 12/2006 |
| KR | 10-2007-0027084 A | 3/2007 |
| KR | 10-2009-0045572 A | 5/2009 |
| KR | 10-2010-0075235 A | 7/2010 |
| TW | 200907524 A | 2/2009 |
| WO | 97/49736 A2 | 12/1997 |

\* cited by examiner

ELECTROPHORETIC PARTICLES, PRODUCTION METHODS OF ELECTROPHORETIC PARTICLES, AND ELECTROPHORETIC DISPLAY DEVICES

CROSS REFERENCE TO RELATED APPLICATIONS

This application is a National Stage of International Application No. PCT/KR2012/002399 filed Mar. 30, 2012, claiming priority based on Korean Patent Application No. 10-2011-0142732 filed Dec. 26, 2011, the contents of all of which are incorporated herein by reference in their entirety.

TECHNICAL FIELD

The present invention relates to electrophoretic particles, methods of producing the electrophoretic particles, and electrophoretic display devices. More specifically, the present invention is directed to electrophoretic particles being able to present excellent color reproductivity and to realize higher contrast and faster response speed and showing excellent shape stability and dispersion stability in an electrophoretic slurry, methods of producing the electrophoretic particles, and electrophoretic display devices including the electrophoretic particles.

BACKGROUND OF THE ART

Electronic paper, also referred to as e-paper, is a type of an electronic device that can play a role of paper because, just like a paper book, a newspaper, or a paper magazine, one can readily carry it around and conveniently read and make notes on it whenever one wants.

Such electronic paper may take a form of an electrophoretic display, which is advantageous in that not only is it flexible enough to be bent, but it can also be produced at a much lower cost than conventional flat panel displays and is far superior in energy efficiency since there is no need to furnish an additional backlight. The electronic paper shows high definition and a wide viewing angle, and may have a memory function such that the letters displayed thereon will not disappear completely even in the absence of power sources.

Such markedly advantageous characteristics of the electronic paper hold great potential for a wide variety of applications such as an electronic book having a paper-like plane and a moving illustration, a self-renewable newspaper, a reusable paper display for cell phones, a disposable TV screen, and electronic wallpaper, and its latent market surely seems to be huge. Depending on the realization method, the electronic paper can be typically classified into an electrophoresis type, a liquid crystal type, a toner (QR-LPD) type, a MEMS type, and the like. Among them, the electrophoretic type is based on electrophoresis of charged pigment particles suspended in a dielectric solvent. When a voltage is applied across the electrodes being opposite to each other, the charged pigment particles are made to migrate toward an electrode bearing a contrary charge to that on the particles by attracting forces, thereby expressing a color or light and shade.

Among such electrophoretic displays, the microcapsule type and the micro-cup type technologies, which are most likely to be commercialized soon, take advantage of particles as a color display element. The microcapsule type of electrophoretic display is a display device wherein a dispersion including charged particles and a flowing fluid is encapsulated in a microcapsule and placed between the opposite electrodes. The micro-cup type of electrophoretic display is a display device wherein a recessed unit as defined by a partition between the opposite electrodes has charged particles or a slurry of charged particles enclosed therein.

However, the electrophoretic display devices hitherto known have failed to sufficiently show color reproducibility or contrast to be actually applied in various fields and did not secure appropriate reactivity to a driving voltage and a capability of appropriately maintaining an afterimage when the driving voltage is eliminated.

In addition, the electrophoretic particles are typically used in the electrophoretic display device as they are dispersed in a flowing fluid, but the electrophoretic particles hitherto known often fail to be stably dispersed in the flowing fluid, resulting in the formation of agglomerates. Moreover, the electrophoretic particles of the prior arts tend to be partially dissolved in the flowing fluid or absorb some of the flowing fluid to swell, showing changes in their properties or true specific gravity themselves, and this can even lead to a decrease in contrast or response speed of the electrophoretic display.

DETAILED DESCRIPTION OF THE INVENTION

Technical Objectives

Thus, the present invention provides electrophoretic particles being able to present excellent color reproductivity and to realize higher contrast and faster response speed, and showing enhanced shape stability and dispersion stability in an electrophoretic slurry.

Further, the present invention is to provide methods of producing the electrophoretic particles.

Further, the present invention provides electrophoretic display devices including the electrophoretic particles.

Technical Solutions

The present invention provides an electrophoretic particle, which includes: a core part including an inorganic particle; a shell layer being formed on the core part and including a first polymeric compound containing an acrylate or vinyl repeating unit and a multifunctional acrylate repeating unit; and a protective layer being formed on the shell layer and including a second polymeric compound containing an acrylate or vinyl repeating unit and a multifunctional aromatic vinyl repeating unit.

In addition, the present invention provides a method of producing an electrophoretic particle, which includes the steps of: adding a first monomer mixture including an acrylate or vinyl monomer, a polymerization initiator, and a compound with at least two acrylate or methacrylate groups to a solvent having inorganic particles dispersed therein and subjecting a resultant mixture to a polymerization reaction at a temperature of 10 to 120° C. for 1 to 50 hours to form a core-shell structured particle; and adding a second monomer mixture including an acrylate or vinyl monomer, a polymerization initiator, and an aromatic compound with at least two vinyl groups to a solvent having the core-shell structured particles dispersed therein and subjecting a resultant mixture to a polymerization reaction at a temperature of 10 to 120° C. for 1 to 50 hours to form a protective layer on the shell layer.

In addition, the present invention provides an electrophoretic display device including: two substrates being opposite to each other; an electrophoretic part being formed between the two substrates; and the aforementioned electrophoretic particles located in the electrophoretic part.

According to specific embodiments of the present invention, the electrophoretic particles, the methods of producing the electrophoretic particles, and the electrophoretic display device will be explained in more detail hereinbelow.

As used herein, the term "electrophoretic particle" means a particle that tends to be charged and may migrate toward an electrode bearing the opposite charge by means of attracting forces between the electrodes when a voltage is applied thereto, thereby expressing a color or light and shade.

According to an embodiment of the present invention, an electrophoretic particle is provided, which includes: a core part including an inorganic particle; a shell layer being formed on the core part and including a first polymeric compound containing an acrylate or vinyl repeating unit and a multifunctional acrylate repeating unit; and a protective layer being formed on the shell layer and including a second polymeric compound containing an acrylate or vinyl repeating unit and a multifunctional aromatic vinyl repeating unit.

The present inventors experimentally discovered that the electrophoretic particles including the inorganic core, the shell layer of a certain structure of polymer, and the protective layer of another structure of polymer may have a high level of dispersion stability in a flowing fluid of an electrophoretic slurry and that their shape or specific viscosity may remain constant since they are neither reacting with nor dissolved in the flowing fluid, and that the electrophoretic display device using the same may also realize excellent color reproductivity, higher contrast, and faster response speed, to complete the present invention.

Each of the shell layer and the protective layer as included in the electrophoretic particle have a stable and robust structure and are bonded to or cross-linked with each other as they are layered one after another, thereby forming an exterior film or a surface layer with more enhanced mechanical properties, shape stability, and solvent-resistance. In other words, the shell layer and the protective layer that are layered and bonded one after another as in the electrophoretic particle of the present invention may exhibit a higher level of shape stability and solvent resistance than the case where each of them is solely formed on the surface of the core. For that reason, the electrophoretic particles of the present invention are neither dissolved in nor reacted with the flowing fluid to swell. Moreover, thanks to the unique structure of the protective layer, the electrophoretic particles of the present invention may also be stably dispersed in the flowing fluid without being agglomerated.

Specifically, the second polymeric compound included in the protective layer includes the multifunctional aromatic vinyl repeating unit in addition to the acrylate or vinyl repeating unit, and thus the electrophoretic particles may exhibit excellent shape stability and a higher level of solvent resistance. In particular, as will be described hereinbelow, the multifunctional aromatic vinyl repeating unit may be a moiety of an aromatic compound having at least two vinyl groups, and the aromatic and vinyl portions of the moiety enable the second polymeric compound to form more robust crosslinkings and crosslinked structures and to be bonded or crosslinked more firmly to the shell layer.

Due to the aforementioned properties, the electrophoretic particle may have excellent shape stability and a higher level of solvent resistance, and thus when they are added to a solvent having a viscosity of 20 cP or less, the viscosity change of that solvent may be no more than 10%, and preferably no more than 5%. The electrophoretic particles are not dissolved in the flowing fluid and do not react with the flowing fluid to swell. Therefore, there is substantially no difference between the viscosity of the flowing fluid alone and the viscosity of the fluid including the particles added therein. The phrase "when the electrophoretic particles are added" includes not only the time when the electrophoretic particles being added but also the time thereafter.

As described below, a solvent having a viscosity of 20 cP or less may be employed as a flowing fluid for the electrophoretic part of the electrophoretic display device. However, if the electrophoretic particles are added to the solvent having a viscosity of 20 cP or less and the viscosity of the resulting mixture exceeds 110% of the original viscosity of the solvent having a viscosity of 20 cP or less, the electrophoretic particles could not easily flow under a voltage being applied to the electrophoretic display device, which may lead to a slower response speed and lower contrast for the device.

In the present specification, the term "electrophoretic slurry" refers to a dispersion including a flowing fluid, electrophoretic particles, and optionally other substances (e.g., an additive such as a dye, a stabilizer, or a dispersant) and being able to react or be driven under a certain driving voltage.

Since the electrophoretic particles show excellent shape stability and a high level of solvent resistance due to their aforementioned characteristics, the viscosity change of the fluid may be no more than 10%, and preferably no more than 5%, when the electrophoretic particles are added to a solvent having a viscosity of 20 cP or less. If the viscosity change exceeds 10%, the charged particles cannot easily flow, and this may cause a decrease in response speed and contrast as well. Because the electrophoretic particles are not dissolved in the flowing fluid and do not react with the flowing fluid to swell, the viscosity of the fluid alone does not substantially differ from that of the fluid including the particles added therein. That is, since the electrophoretic particles are not dissolved in the flowing fluid and do not react with the flowing fluid to swell, there is no substantial difference between the original viscosity of the solvent having a viscosity of 20 cP or less and the viscosity of the solvent having particles added thereto.

The electrophoretic particles may have a low specific gravity, for example, a true specific gravity of 1.60 g/cm$^3$ or less, and preferably a specific gravity of 0.8 to 1.5 g/cm$^3$. The true specific gravity refers to specific gravity of a substance itself, not the apparent specific gravity. Specifically, it refers to specific gravity of a substance itself obtained by taking the effect of the pores between or within the particle(s) into account, and it can be measured from a converted value of a pressure change occurring when an inert gas being injected to a closed chamber.

In the past, a specific gravity controller or a halogen solvent was used for the purpose of lowering the specific gravity of the slurry of the electrophoretic particles, but such measures unfavorably resulted in deterioration of the characteristics of electric double layers and the electrophoretic properties of the particles. By contrast, the electrophoretic particles in accordance with an embodiment of the present invention have such a low specific gravity, enabling realization of a decreased specific gravity of the electrophoretic particles even without using the specific gravity controller or the halogen solvent.

The maximum diameter of the core may range from 30 nm to 1 μm, preferably from 100 nm to 800 nm. An excessively large diameter of the core may bring about a decrease in the flowing rate of the particle or deterioration of the pixel quality of the display device using the electrophoretic particles. An excessively small diameter thereof may result in a significant decrease in a contrast ratio.

The inorganic particle being included in the core part may be titanium oxide, magnesium oxide, zinc oxide, calcium oxide, zirconium oxide, iron oxide, CrCu, carbon black, phthalocyanine blue, phthalocyanine green, diarylide yellow, diarylide AAOT yellow, and quinacridone, azo, rhodamine, perylene pigment series, Hansa yellow G particles, or a mixture thereof. More preferably, if white charged particles are to be employed, one may use metallic inorganic particles such as $TiO_2$, MgO, or the like, or organic compounds thereof. If colored charged particles are to be employed, it is possible to take advantage of organic or inorganic pigments such as CuCr, carbon black, or the like.

The shell layer being formed on the core part may have a thickness of 1 nm to 15 μm, preferably 25 nm to 1 um. If the shell layer is too thick, the contrast ratio may deteriorate. If the shell layer is too thin, the density of the particles may become so high that bi-stability is not maintained.

The shell layer can include the first polymeric compound containing an acrylate repeating unit or a vinyl repeating unit. Per 100 parts of weight of the first polymeric compound, the acrylate or vinyl repeating unit may be contained in an amount of 50 to 99 parts by weight.

The acrylate repeating unit as contained in the first polymeric compound may include a repeating unit of Chemical Formula 1, and the vinyl repeating unit as contained in the first polymeric compound may include a repeating unit of Chemical Formula 2, as follows.

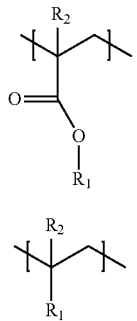

[Chemical Formula 1]

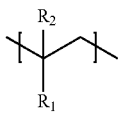

[Chemical Formula 2]

In Chemical Formula 1 or Chemical Formula 2, each $R_1$ is a C1 to C30 alkyl group, a C2 to C30 alkenyl group, a C6 to C30 aryl group, a C7 to C30 alkylaryl group, a C7 to C30 arylalkyl group, a C4 to C20 cycloalkyl group, an amide group unsubstituted or substituted with a C1 to C20 alkyl group, or an alkoxycarbonyl group C1 to C20, and each $R_2$ is hydrogen or a C1 to C3 alkyl group.

It is also preferable that, in Chemical Formula 1 and Chemical Formula 2, each $R_1$ is a C1 to C10 alkyl group, a C6 to C10 aryl group, a C5 to C10 cycloalkyl group, or an amide group unsubstituted or substituted with a C1 to C10 alkyl group, and each $R_2$ is hydrogen or a methyl group.

The first polymeric compound may include a multifunctional acrylate repeating unit in conjunction with the acrylate or vinyl repeating unit. The inclusion of the multifunctional acrylate repeating unit may increase the number of crosslinkings between the first polymeric compounds contained in the shell layer and increase the crosslinking density of the shell layer.

The multifunctional acrylate repeating unit may be contained in an amount of 1 to 50 parts by weight, and preferably 3 to 20 parts by weight, with respect to 100 parts by weight of the first polymeric compound. An excessively low content of the multifunctional acrylate repeating unit may cause difficulties in having a sufficient crosslinking density or enhanced hardness, while an excessively high content thereof may lead to uneven or deteriorating properties of the shell layer.

The multifunctional acrylate repeating unit may include a moiety of a compound with at least two acrylate or methacrylate groups.

In the present specification, the term "moiety" refers to a portion or a unit derived from a certain compound and included in a product of a chemical reaction as the certain compound takes part in the chemical reaction. By way of an example, a moiety of a compound with at least two acrylate or methacrylate groups refers to the repeating unit derived from the compound with at least two acrylate or methacrylate groups among the repeating units included in the first polymeric compound that has been formed by a reaction between the acrylate or vinyl monomer and the compound with at least two acrylate or methacrylate groups.

Specific examples of the compound with at least two acrylate or methacrylate groups include 1,2-ethanediol diacrylate, 1,3-propanediol diacrylate, 1,3-butanediol diacrylate, 1,4-butanediol diacrylate, 1,5-pentanediol diacrylate, neopentyl diacrylate, 1,6-hexanediol diacrylate, ethylene glycol diacrylate, propylene glycol diacrylate, butylene glycol diacrylate, triethylene glycol diacrylate, and tetraethylene glycol diacrylate, and preferably, it may be ethylene glycol diacrylate. Thus, the multifunctional diacrylate repeating unit as included in the first polymeric compound may include the moiety of the foregoing compounds.

The protective layer may include the second polymeric compound, which may include an acrylate repeating unit or a vinyl repeating unit. The acrylate or vinyl repeating unit may account for an amount of 50 to 99 parts by weight among 100 parts by weight of the second polymeric compound.

The second polymeric compound may also include an acrylate repeating unit or a vinyl repeating unit. The acrylate repeating unit may include a repeating unit of Chemical Formula 1, and the vinyl repeating unit may include a repeating unit of Chemical Formula 2.

In addition to the acrylate or vinyl repeating unit, the second polymeric compound may include a multifunctional aromatic vinyl repeating unit, which may be a moiety of an aromatic compound having at least two vinyl groups. The aromatic compound having at least two vinyl groups refers to a compound including an aromatic group or functional group therein and having at least two vinyl groups introduced thereto.

Specifically, the aromatic compound having at least two vinyl groups may be divinyl benzene, bis-(vinyl phenyl) ethane, or triallylcyanurate, and preferably, it may be divinyl benzene.

Since the second polymeric compound includes the multifunctional aromatic vinyl repeating unit, the second polymeric compound included in the protective layer has an increased number of crosslinkings therebetween and the protective layer may possess an increased crosslinking density. In particular, the second polymeric compound including the multifunctional aromatic vinyl repeating unit may form more robust crosslinkings and a denser crosslinked structure than the first polymeric compound described above, and thereby enables the electrophoretic particles to have a protective layer with excellent shape stability and high solvent resistance formed on their surfaces.

The multifunctional aromatic vinyl repeating units may be included in an amount of 1 to 50 parts by weight, and preferably 3 to 20 parts by weight, with respect to 100 parts by weight of the second polymeric compound. With an excessively low content of the multifunctional aromatic vinyl repeating unit, the protective layer may have difficulties in securing a sufficiently high density of crosslinkings and an enhanced level of hardness, and may fail to show sufficient shape stability and high solvent resistance. Meanwhile, an excessively high content of the multifunctional aromatic vinyl repeating unit may lead to uneven or inferior properties of the protective layer.

The shell layer or the protective layer may further include a trace amount of a dispersion stabilizer or a polymerization initiator. The dispersion stabilizer may be added to a solvent having inorganic particles dispersed therein during the production process of the electrophoretic particles, making it possible for each component to be stably dispersed. Further, it may either prevent each component from being agglomerated with each other in the emulsifying step as will be described below or minimize the likelihood of polymerization agglomerates occurring in the polymerization process. Since the dispersion stabilizer or the polymerization initiator is, however, to be eliminated in a washing step or the like during the production process of the electrophoretic articles, just a trace amount thereof may be present in the core part. Specific examples of the dispersion stabilizer and the polymerization initiator are the same as will be enumerated below.

As described above, the shell layer and the protective layer may have enhanced mechanical properties, shape stability, and solvent resistance because they are crosslinked or bonded with each other while being layered one after another. Specifically, the first polymeric compound and the second polymeric compound may be reacted or crosslinked with each other, and thereby the electrophoretic particles are neither dissolved in nor react with the flowing fluid to swell, and thus they can be stably dispersed in the flowing fluid without agglomeration.

The first and the second polymeric compounds may have a weight average molecular weight of 10,000 to 200,000, respectively.

According to another embodiment of the present invention, a production method of the electrophoretic particles is provided, which includes the steps of: adding a first monomer mixture including an acrylate or vinyl monomer, a polymerization initiator, and a compound with at least two acrylate groups or methacrylate groups to a solvent having inorganic particles dispersed therein and subjecting a resultant mixture to a polymerization reaction at a temperature of 10 to 120° C. for 1 to 50 hours to form a core-shell particle; and adding a second monomer mixture including an acrylate or vinyl monomer, a polymerization initiator, and an aromatic compound with at least two vinyl groups to a solvent having the core-shell particles dispersed therein and subjecting a resultant mixture to a polymerization reaction at a temperature of 10 to 120° C. for 1 to 50 hours to form a protective layer on the shell.

A first monomer mixture having a certain composition is added to the solvent having the inorganic particles dispersed therein and subjected to a polymerization reaction to form a core-shell structured particle that has a core part including the inorganic particle and a shell layer including the first polymeric compound and being formed on the core part. A second monomer mixture having a certain composition is thereafter added to the solvent having the core-shell structured particles dispersed therein, and is then subjected to a polymerization reaction to form a protective layer on the surface of the shell, thereby producing the electrophoretic particles of the present invention.

As described above, the electrophoretic particles as produced according to the aforementioned production method have a high level of dispersion stability in the flowing fluid of the electrophoretic slurry, and since they are neither dissolved in nor react with the flowing fluid, their particle shape or specific viscosity consistently may be remained unchanged, and thus the electrophoretic display device using them may accomplish excellent color reproductivity, higher contrast, and faster response speed.

The first polymeric compound contained in the shell layer may be made from the first monomer mixture, and the second polymeric compound contained in the protective layer may be made from the second monomer mixture.

The amount of the acrylate or vinyl monomer as contained in the first monomer mixture or the second monomer mixture may be properly adjusted depending on desired properties, such as a weight average molecular weight for the first and second polymeric compounds prepared by the aforementioned production methods. By way of an example, it can be used in such an amount that the repeating units derived from the acrylate or vinyl monomer account for 50 to 99 parts by weight among 100 parts by weight of the first or second polymeric compound.

The acrylate monomer contained in the first or second monomer mixture may be a compound of Chemical Formula 3, and the vinyl monomer may be a compound of Chemical Formula 4.

[Chemical Formula 3]

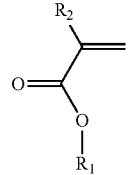

[Chemical Formula 4]

In Chemical Formula 3 or Chemical Formula 4, each $R_1$ is a C1 to C30 alkyl group, a C2 to C30 alkenyl group, a C6 to C30 aryl group, a C7 to C30 alkylaryl group, a C7 to C30 arylalkyl group, a C4 to C20 cycloalkyl group, an amide group unsubstituted or substituted with a C1 to C20 alkyl group, or a C1 to C20 alkoxycarbonyl group, and each $R_2$ is hydrogen or a C1 to C3 alkyl group.

It is preferred that in Chemical Formula 3 and Chemical Formula 4, each $R_1$ is a C1 to C10 alkyl group, a C6 to C10 aryl group, a C5 to C10 cycloalkyl group, or an amide group unsubstituted or substituted with a C1 to C10 alkyl group, and each $R_2$ is hydrogen or a methyl group.

The compound having at least two acrylate or methacrylate groups as contained in the first monomer mixture undergoes a polymerization process to be incorporated into the first polymeric compound as a repeating unit, and also acts as a crosslinker to increase the number of crosslinkings between the first polymeric compounds included in the shell layer and plays a role of increasing the crosslinking density of the shell layer.

In the first monomer mixture, the compound having at least two acrylate or methacrylate groups may be used in such an amount that the repeating units derived from the compound having said at least two acrylate or methacrylate groups account for 1 to 50 parts by weight, and preferably 3 to 20 parts by weight, among 100 parts of the first polymeric compound prepared by the aforementioned production method.

Specific examples of the compound having at least two acrylate or methacrylate groups include 1,2-ethanediol diacrylate, 1,3-propanediol diacrylate, 1,3-butanediol diacrylate, 1,4-butanediol diacrylate, 1,5-pentanediol diacrylate, neopentyl diacrylate, 1,6-hexanediol diacrylate, ethylene glycol diacrylate, propylene glycol diacrylate, butylene glycol diacrylate, triethylene glycol diacrylate, and tetraethylene glycol diacrylate, and preferably, it may be ethylene glycol diacrylate.

The aromatic compound having at least two vinyl groups as contained in the second monomer mixture undergoes a polymerization process to be incorporated into the second polymeric compound as a repeating unit, and also acts as a crosslinker to increase the number of the crosslinkings between the second polymeric compounds included in the protective layer and plays a role of increasing the crosslinking density of the protective layer.

Using the aromatic compound having at least two vinyl groups makes it possible to form more robust crosslinkings and a denser crosslinked structure for the protective layer, and thereby the electrophoretic particles may have a protective layer with excellent shape stability and higher solvent resistance formed on their surfaces.

In the second monomer mixture, the aromatic compound having at least two vinyl groups is used in such an amount that the repeating units derived from the aromatic compound having at least two vinyl groups accounts for an amount of 1 to 50 parts by weight, and preferably 3 to 20 parts by weight, among 100 parts by weight of the second polymeric compound prepared by the aforementioned production method.

Specific examples of the aromatic compound having at least two vinyl groups include divinyl benzene, bis-(vinyl phenyl)ethane, and triallylcyanurate, and it may preferably be divinyl benzene.

The solvent having the inorganic particles dispersed therein or the solvent having the core-shell structured particles dispersed therein may be prepared by adding the inorganic particles or the core-shell structured particles to a water-soluble solvent and utilizing a typical stirring or mixing technique. In this regard, the temperature may be room temperature, for example, ranging from 10 to 40° C. Specific examples of the water soluble solvent include distilled water, ultra-purified water, alcoholic solvents, and a mixture thereof.

For the polymerization initiator, one may use any one known to be available for polymerization of an acrylate or vinyl monomer without particular limitations. Preferably, it is possible to use azo initiators, peroxide initiators, or a mixture thereof. The azo initiators are compounds that are capable of initiating polymerization via thermal decomposition, and by way of examples, one may use 2,2-azobisisobutyronitrile, 4,4-azobis(4-cyanopentanoic acid), 2,2-azobis(2-methyl butyronitrile), 2,2'-azobis(2,4-dimethylvaleronitrile), and the like. For the peroxide initiators, one may use benzoyl peroxide, lauryl peroxide, octanoyl peroxide, dicumyl peroxide, or the like.

The polymerization initiator may be used in an amount of 0.1 to 10 parts by weight with respect to 100 parts by weight of the first monomer mixture or the second monomer mixture. An excessively small amount of the polymerization initiator being used may lead to an excessively large amount of the monomers failing to participate in the polymerization reaction, and an excessively large amount thereof may render the polymerization extremely exothermic, resulting in a decrease in reaction stability.

The solvent having the inorganic particles dispersed therein or the solvent having the core-shell structured particles dispersed therein may further include a dispersion stabilizer. Specific examples of the dispersion stabilizer include polyvinyl pyrrolidone, polyvinyl methyl ether, polyethylene imine, polymethyl methacrylate acrylic acid copolymers, polyvinyl alcohol, vinyl acetate copolymers, ethyl cellulose, hydroxypropyl cellulose, or a mixture thereof.

The dispersion stabilizer may be used in an amount of 0.1 to 10 parts by weight with respect to 100 parts of the first or second monomer mixture. As excessively small amount of the dispersion stabilizer being used may have only a marginal effect of improving the stability of each component in the emulsifying step or minimizing the occurrence of polymerization agglomerates, while an excessively large amount thereof may bring about difficulties in eliminating the dispersion stabilizer in a subsequent process of washing the electrophoretic particles.

In order to form a more uniform shell layer on the surface of the core part including the inorganic particles, the first monomer mixture is added to the solvent having the inorganic particles dispersed therein by an amount of 0.1 mL to 3 mL at a time. As such, the polymerization is carried out with fine drops of the first monomer mixture being added dropwise, and thereby the shell layer including the first polymeric compound may be more uniformly formed on the surface of the inorganic particles.

Furthermore, in order to form a more uniform protective layer on the surface of the core-shell structure particles, the second monomer mixture may be added to the solvent having the core-shell structure particles dispersed therein by an amount of 0.1 mL to 3 mL at a time. As such, the polymerization is conducted with fine drops of the second monomer mixture being added dropwise so that the protective layer including the second polymeric compound may be more uniformly formed on the surface of the core-shell structure particle.

As described above, the shell layer and the protective layer laminated one after another onto the core part including the inorganic particles in accordance with the aforementioned production method may be bonded or crosslinked with each other to exhibit more enhanced mechanical properties, shape stability, and solvent resistance. Specifically, the first polymeric compound and the second polymeric compound each being contained in the shell layer and the protective layer in accordance with the production method are reacted or crosslinked together, and thereby the electrophoretic particles of the present invention will neither be dissolved in nor react with the flowing fluid to swell, and thus the particles may be stably dispersed in the flowing fluid without being agglomerated. The first polymeric compound and the second polymeric compound may have a weight average molecular weight of 10,000 to 200,000, respectively.

According to another embodiment of the present invention, an electrophoretic display device is provided, including: two substrates being opposed to each other; an electrophoretic part being formed between the two substrates; and the aforementioned electrophoretic particles located in the electrophoretic part.

As described above, the electrophoretic particles prepared by forming the shell layer on the inorganic core and then forming the protective layer on the shell layer show a high level of dispersion stability in the flowing fluid of the electrophoretic slurry, and they are not dissolved in and do not react with the flowing fluid so that their shape or specific viscosity can remain consistent and the electrophoretic display device using them may achieve excellent color reproductivity, higher contrast, and faster response speed.

Details for the electrophoretic particles are the same as set forth above.

The "substrate" refers to the opposite surfaces inside the electrophoretic display device including the electrophoretic part, and for example, the substrate surfaces constituting the upper/lower sides. The substrate may have different types of layers, structures, or electrodes for electrophoresis formed on one side of the surface or included inside the substrate.

Accordingly, the substrate may include a backing layer, an electrically conductive layer, an electrode layer, or the like. As the backing layer, it is possible to use any one available for a backing layer or a substrate for the display device without particular limitations. By way of examples, one may use a thermoplastic or thermosetting resin, or PET, PAN, PI, or glass. In addition, as the electrically conductive layer, one may use any electrically conductive material known to be available for display devices without particular limitations, and for example, it is possible to use CNT, an electrically conductive polymer, or the like. For the electrode layer, one may use any electrode material known in the art to be available for a display element without particular limitations, but at least one of the electrode materials included in either substrate should be a transparent electrode material such as ITO, $SnO_2$, ZnO, or IZO (indium zinc oxide).

The electrophoretic part refers to a region wherein, when a voltage is applied across the substrates being opposite to each other, charged particles migrate toward the electrode by means of the attracting forces to express a color or light and shade. The electrophoretic part may include the flowing fluid and the electrophoretic particles suspended in the flowing fluid. In the electrophoretic part, the ratio between the electrophoretic particles and the flowing fluid is not particularly limited, but the volume ratio between the electrophoretic particles and the flowing fluid may be, for example, from 5:95 to 60:40, and preferably from 7:93 to 40:60. As the flowing fluid, it is possible to use a solvent having a viscosity equal to or less than 20 cP. Examples of the flowing fluid include hydrocarbons such as decahydronaphthalene (decalin), 5-ethylidene-2-norbornene, fatty oils, paraffin oils (such as Isopar G, Isopar L, Isopar M, and the like); aromatic hydrocarbons such as toluene, xylene, phenylxylylethane, dodecylbenzene, and alkylnaphthalene; halogenated solvents such as perfluorodecaline, perfluorotoluene, perfluoroxylene, dichlorobenzotrifluoride, 3,4,5-trichlorobenzotrifluoride, chloropentafluoro-benzene, dichlorononane, and pentachlorobenzene; perfluoro solvents; and low molecular weight halogen solvents including polymers such as perfluoro polyalkyl ether.

The shape and the structure of the electrophoretic part are not particularly limited, and for example, may include a microcapsule or micro-cup structure. The "micro-cup" refers to a recessed portion having a cup shape formed in the electrophoretic display device, and by way of an example, a space surrounded by two electrodes being opposite to each other and a partition formed between the electrodes. The "microcapsule" refers to a closed container of a sphere or an ellipsoid, which is formed inside the electrophoretic display device and has a diameter in the order of micrometers (um).

The micro-cup may have a size and a shape defined by the partition that is formed in the electrophoretic part, and it can be properly adjusted depending on the characteristics and the size of the electrophoretic display device to be prepared. By way of an example, the partition has a height of 10 to 500 um and a thickness of 2 to 100 um with a cross-section of different shapes such as a rectangle, a square, or a trapezoid, but the present invention is not limited thereto. In addition, the micro-cup may have a planar shape such as a circle, a triangle, a quadrangle, a rectangle, an oval, or various polygons.

The size and the material type of the microcapsule may vary with the characteristics of the display being fabricated. For example, each microcapsule may have a circle or an oval shape with a diameter of 10 to 1000 um. The microcapsule may be bonded to a substrate with a binding agent or an organic solvent to establish an electrophoretic part. However, the present invention is not limited thereto, and it is possible to use any electrophoretic part known in the art as available for a microcapsule type of electrophoretic display without particular limitations.

Except for what has been detailed hereinabove, any apparatus, any elements, and any methods known to be typically used in electrophoretic display devices may be applied to the embodiments of the present invention without particular limitations.

When using the electrophoretic particles as set forth above, the electrophoretic display device of the present invention may exhibit higher contrast, for example, at least 12:1 (white:black), and can realize faster response speed.

Advantageous Effect of the Invention

According to the present invention, electrophoretic particles that are able to present excellent color reproductivity and to realize higher contrast and faster response speed, and have high shape stability and dispersion stability in the electrophoretic slurry, and electrophoretic display devices including the same, are provided.

DETAILS FOR PRACTICING THE INVENTION

Figure 1:
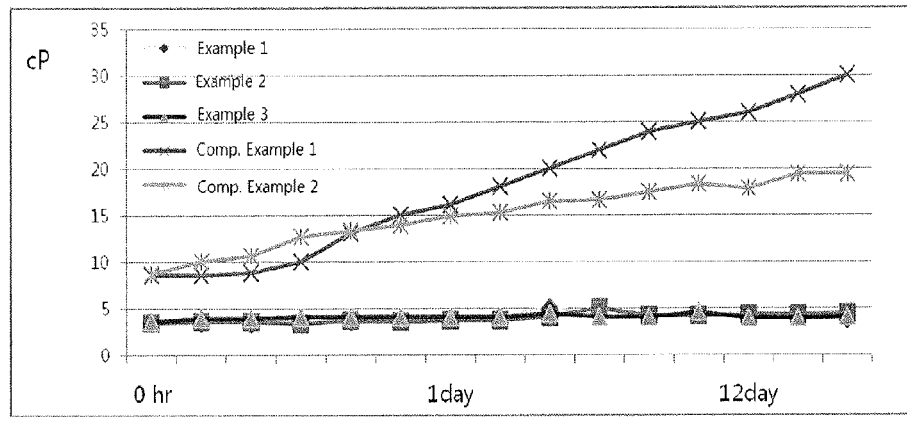
FIG. 1 illustrates the results of Experimental Example 2 of measuring solvent resistance of the electrophoretic particles obtained from the examples and the comparative examples.

Hereinafter, the invention will be explained in further detail with reference to the following examples, but these examples are merely to illustrative of the present invention, the scope of which shall not be limited thereby.

EXAMPLES 1 TO 3

Preparation of the Electrophoretic Particles

Example 1

(1) Preparation of Core-Shell Structured Particles 5 g of polyvinyl alcohol (PVA) as a dispersion stabilizer and 20 g of TiO2 were dispersed in deionized water as a dispersion medium, and the dispersion was then homogenized and emulsified by using a high speed homogenizer at 8000 rpm for 5 minutes.

Then, 70 g of methyl methacrylate (MMA), 20 g of ethylene glycol dimethacrylate (EGDMA) as a multifunctional monomer and 1 g of 2,2-azobisisobutyronitrile (AIBN) as a polymerization initiator were mixed therein, and the resulting mixture was added to the emulsion at 0.5 mL at a time and reacted under a nitrogen atmosphere at 50° C. for 6 hours, and then at an elevated temperature of 75° C. for 4 hours.

The polymer as synthesized via the reaction was filtered and washed with an aqueous solution of water and ethanol and dried in a vacuum oven for one day to prepare core-shell type particles having a white color and no smell.

(2) Formation of the Protective Layer on the Surface of the Core-Shell Structured Particles 5 g of polyvinyl alcohol (PVA) as a dispersion stabilizer and 20 g of the core-shell structured particles thus recovered were dispersed in deionized water as a dispersing medium, and the dispersion was then homogenized and emulsified by using a high speed homogenizer at 8000 rpm for 5 minutes.

Then, 70 g of methyl methacrylate (MMA), 20 g of divinyl benzene (DVB) as a multifunctional monomer, and 1 g of 2,2-azobisisobutyronitrile (AIBN) as a polymerization initiator were mixed and the resulting mixture was added to the emulsion at 0.5 mL at a time and reacted under a nitrogen atmosphere at 50° C. for 6 hours, and then at an elevated temperature of 75° C. for 4 hours.

The polymer as synthesized via the reaction was filtered and then washed with an aqueous solution of water and ethanol and dried in a vacuum oven for one day to prepare electrophoretic particles.

Example 2

Electrophoretic particles were prepared in the same manner as set forth in Example 1, except for using styrene instead of methyl methacrylate.

Example 3

Electrophoretic particles were prepared in the same manner as set forth in Example 1, except for using butyl methacrylate instead of methyl methacrylate.

Comparative Example

Preparation of Electrophoretic Particles

Comparative Example 1

70 g of methyl methacrylate (MMA) and 20 g of ethylene glycol dimethacrylate (EGDMA) as a multifunctional monomer were mixed, and 1 g of 2,2-azobisisobutyronitrile (AIBN) as a polymerization initiator was added thereto. 5 g of polyvinyl alcohol (PVA) as a dispersion stabilizer and 20 g of $TiO_2$ were dispersed in deionized water as a dispersion medium, and the dispersion was added to the mixture, which was then homogenized and emulsified by using a high speed homogenizer at 8000 rpm for 5 minutes.

Then, the emulsion was placed in a reaction tube and subjected to reaction under a nitrogen atmosphere at 50° C. for 6 hours and then at an elevated temperature of 75° C. for 4 hours. The polymer as synthesized via the reaction was filtered and then washed with an aqueous solution of water and ethanol and dried in a vacuum oven for one day to prepare core-shell type particles having a white color and no smell.

Comparative Example 2

70 g of methyl methacrylate (MMA) and 20 g of divinyl benzene (DVB) as a multifunctional monomer were mixed, and 1 g of 2,2-azobisisobutyronitrile (AIBN) as a polymerization initiator was added thereto. 5 g of polyvinyl alcohol (PVA) as a dispersion stabilizer and 20 g of $TiO_2$ were dispersed in deionized water as a dispersing medium and the dispersion was added to the mixture, which was then homogenized and emulsified by using a high speed homogenizer at 8000 rpm for 5 minutes.

Then, the emulsion was placed in a reaction tube and subjected to reaction under a nitrogen atmosphere at 50° C. for 6 hours and then at an elevated temperature of 75° C. for 4 hours. The polymer as synthesized via the reaction was filtered and then washed with an aqueous solution of water and ethanol and dried in a vacuum oven for one day to prepare core-shell type particles having a white color and no smell.

Experimental Example

Experimental Example 1

Measurement of True Specific Gravity of Electrophoretic Particles

True specific gravity of the electrophoretic particles as obtained from the examples and comparative examples respectively was measured by using a pycnometer (from Micromeritics Instrument).

TABLE 1

Results of Experimental Example 1

|  | true specific gravity [g/cm$^3$] |
|---|---|
| Example 1 | 1.25 |
| Example 2 | 1.26 |
| Example 3 | 1.31 |
| Comp. Example 1 | 1.15 |
| Comp. Example 2 | 1.20 |

Experimental Examples 2

Measurement of Solvent Resistance of the Electrophoretic Particles and Observation of the Appearance Thereof 1. Measurement of Solvent Resistance Evaluation of the solvent resistance was made in order to determine changes in the oil absorbance degree and the swelling degree for the electrophoretic particles obtained in Examples 1 to 3. Specific methods for the measurement are the same as follows.

A halocarbon and an isoparaffin oil were mixed at a ratio of 1:1 to prepare a flowing fluid having a density of 3 cP. Then, the electrophoretic particles obtained from the examples and the comparative examples were mixed with a black dye (from Dow Chemical Co. Ltd.) at a ratio of 5:1 and then dispersed in the flowing fluid as prepared above to produce electrophoretic slurries. At this time, charged particles were included in such an amount that they accounted for 60% by weight among the total composition, and changes in viscosity over time were measured by using a viscometer (Brookfield LVDV-II, spindle No. 2, 30 rpm).

As shown in FIG. 1, in case of the particles of Examples 1 to 3, the viscosity did not substantially change over time and remained constant. By contrast, in case of the particles of Comparative Examples 1 and 2, the viscosity exhibited a sharp increase as time passed. Thus, the electrophoretic particles of the examples neither reacted with nor were dissolved in the flowing fluid so that they maintained their shape or specific viscosity consistently, and such results confirm their excellent shape stability and a high level of solvent resistance.

Such a test for solvent resistance uses a principle wherein the viscosity of the electrophoretic particles increases as they absorb the flowing fluid and swell to a greater size. With poor solvent resistance, electrophoretic particles have a swelled surface due to the flowing fluid being used and thus the amount of the electrophoretic slurry decreases over time, and as a result, the viscosity of the slurry increases.

2. Observation of the Appearance

The electrophoretic particles as obtained from Examples 1 and 2 and Comparative Examples 1 respectively were dispersed in a hydrocarbon solvent (a 1:1 solution of Isopar G and a halocarbon) and observed using a SEM after one day.

Figure 2:
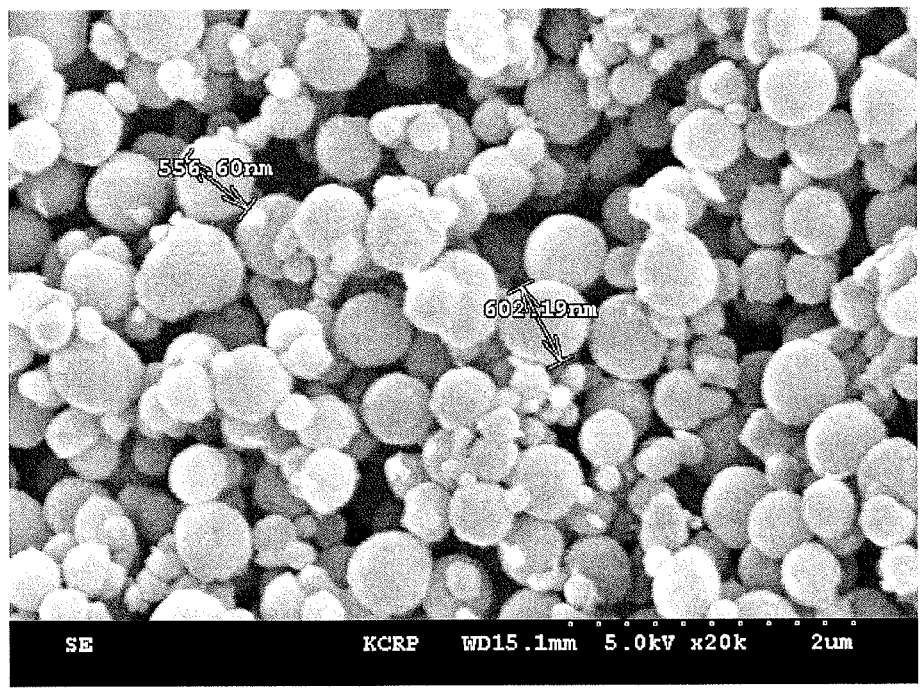
FIG. 2 shows a SEM image taken one day after the electrophoretic particles obtained from Example 1 were dispersed in a hydrocarbon solvent (a 1:1 solution of Isopar G:Halocarbon) at a ratio of 5:1.
Figure 3:
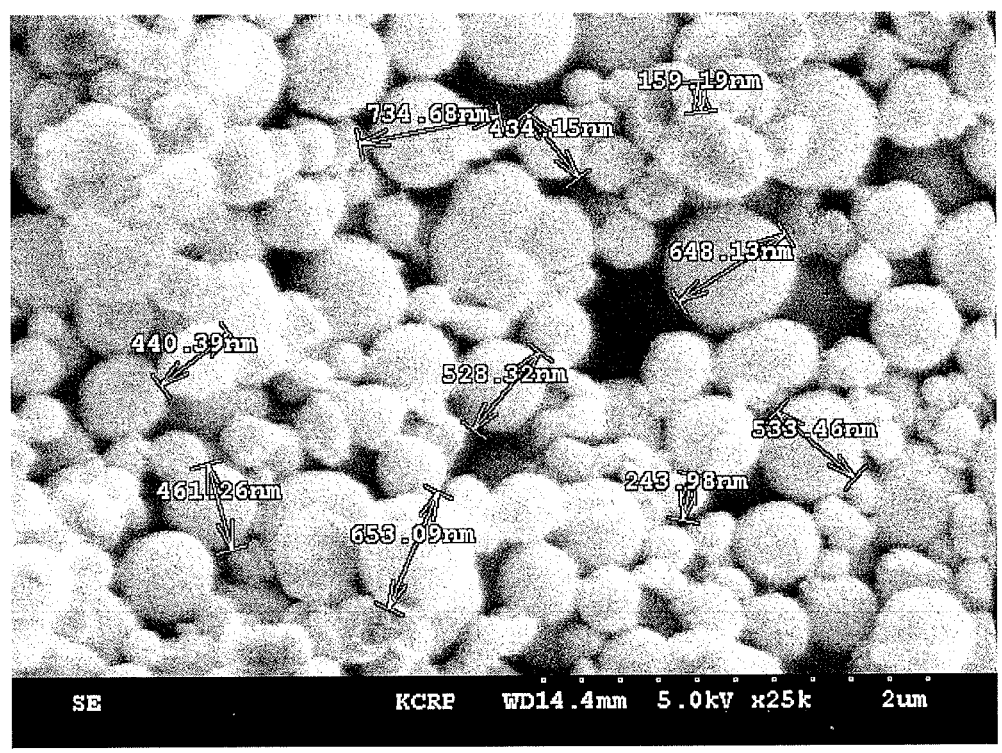
FIG. 3 shows a SEM image taken one day after the electrophoretic particles obtained from Example 2 were dispersed in a hydrocarbon solvent (a 1:1 solution of Isopar G:Halocarbon) at a ratio of 5:1.
Figure 4:
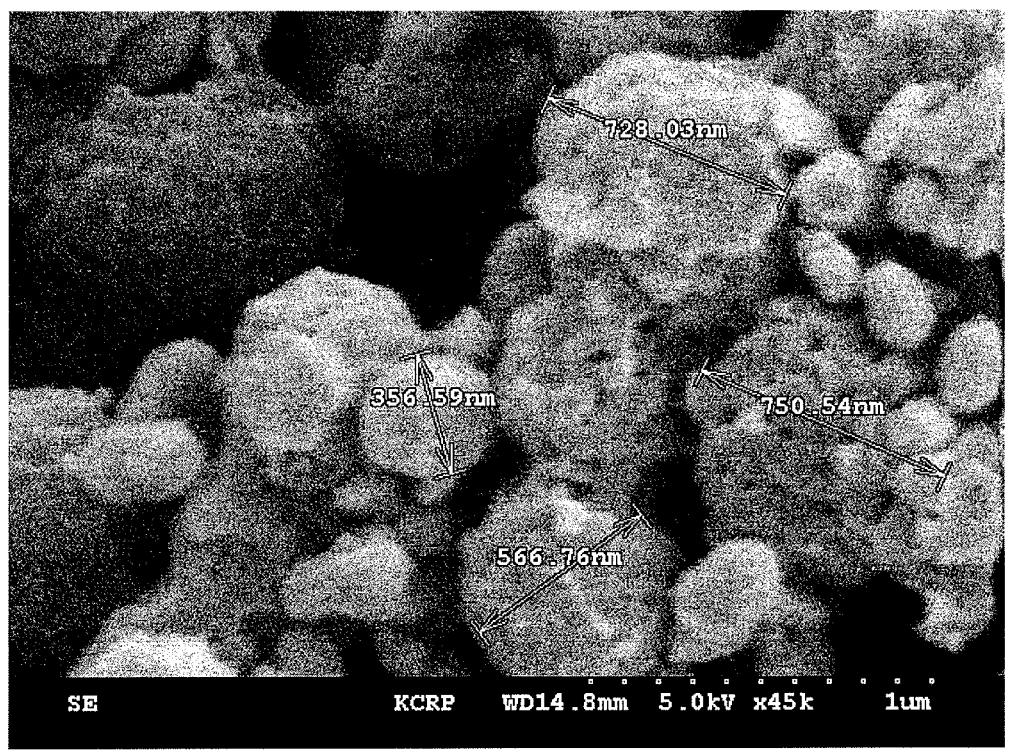
FIG. 4 shows a SEM image captured one day after the electrophoretic particles obtained from Comparative Example 1 were dispersed in a hydrocarbon solvent (a 1:1 solution of Isopar G:Halocarbon) at a ratio of 5:1.
Figure 5:
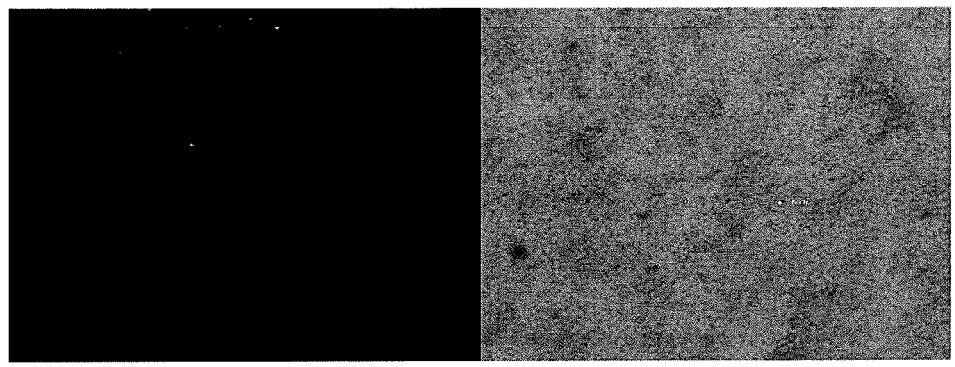
FIG. 5 illustrates the results of measuring the contrast ratio of the electrophoretic display device using the electrophoretic particles obtained from Example 1.
Figure 6:
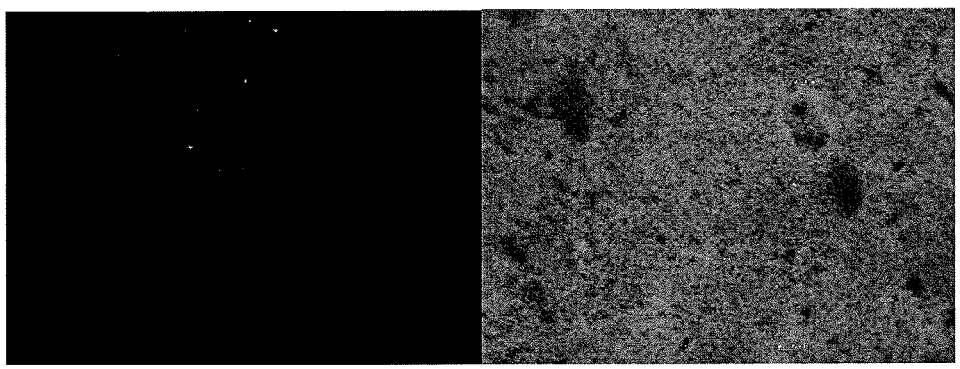
FIG. 6 illustrates the results of measuring the contrast ratio of the electrophoretic display device using the electrophoretic particles obtained from Example 2.
Figure 7:
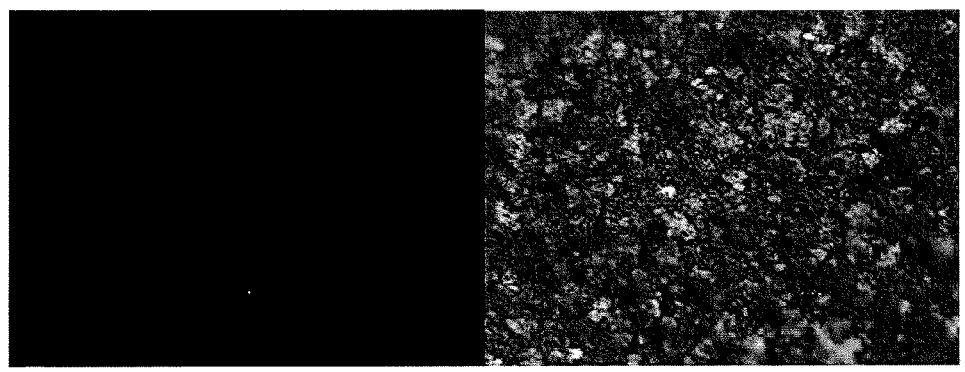
FIG. 7 illustrates the results of measuring the contrast ratio of the electrophoretic display device using the electrophoretic particles obtained from Comparative Example 1.
Figure 8:
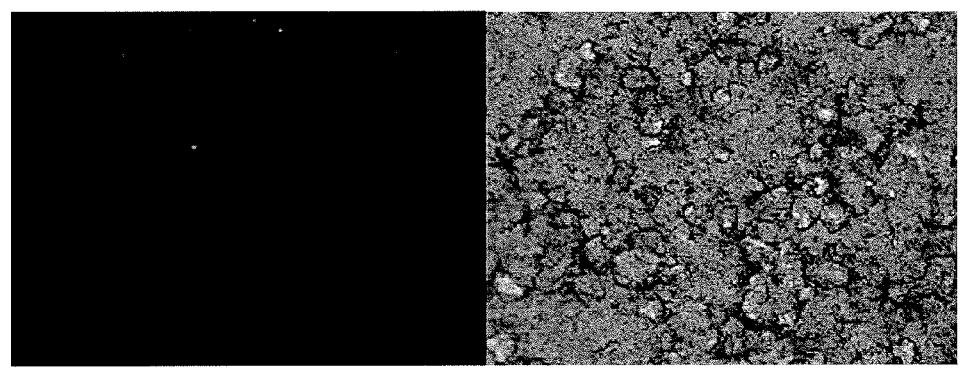
FIG. 8 illustrates the results of measuring the contrast ratio of the electrophoretic display device using the electrophoretic particles obtained from Comparative Example 2.

As shown in FIG. 2 and FIG. 3, the electrophoretic particles of Examples 1 and 2 maintain their smooth surface and round shape even one day after being in a dispersed state in the solvent. By contrast, as shown in FIG. 4, the electrophoretic particles of Comparative Example 1 have pores appeared on their surface in one day after being in a dispersed state in the solvent, confirming that they swelled and thus failed to maintain their round shape.

Experimental Examples 3

Stability Evaluation of a Slurry of Electrophoretic Particles

Slurries of electrophoretic particles were prepared in the same manner as in Experimental Example 2 using the electrophoretic particles obtained from Examples 1 to 3 and Comparative Examples 1 and 2, and for these particles, the dispersion stability of the electrophoretic slurry was measured in accordance with the following manners.

(1) Specific Method for the Measurement

The stability of the electrophoretic slurry was measured using a stability analyzer, LumiFuge, (from L.U.M. GmbH). This analyzer is an instrument that compares the stability of the samples by applying centrifugal forces to the sample, and it performs the measurement using transmissivity of the sample for near infrared rays. A dispersed material has a typical tendency of de-mixing whereby the material tries to return to the previous state prior to being dispersed, and the stability of the slurry was measured by determining such a de-mixing tendency.

Specifically, rotating each of the slurry samples of the electrophoretic particles of the examples and the comparative examples by means of a strong centrifugal force makes the dispersed materials in a tube move in a certain manner depending on the degree of being dispersed and the properties of the particles. At this time, the transmissivity of the sample for NIR is measured over time at different positions in the tube so as to determine the changes in the graph of light transmissivity at each position over time.

In this regard, the lower the slope of the graph of the light transmissivity at each position over time, the higher the stability the slurry possesses. The data as shown in Table 2 confirms that the electrophoretic slurry of the examples have a lower slope, i.e., an enhanced level of dispersion stability.

TABLE 2

Results of Experimental Example 3

|   | slope | results of stability evaluation |
|---|---|---|
| Example 1 | 120 | ⊚ |
| Example 2 | 116 | ⊚ |
| Example 3 | 112 | ⊚ |
| Comp. Example 1 | 290 | Δ |
| Comp. Example 2 | 266 | Δ |

Experimental Example 4

Performance Test for Electrophoretic Display Devices

The electrophoretic particles as obtained from the examples and the comparative examples, respectively, were dispersed in a hydrocarbon solvent (a 1:1 solution of Isopar G and a halocarbon) at a ratio of 5:1 to prepare a slurry of the electrophoretic particles. Changes in the contrast and the speed depending on the different white particles were observed one day after the preparation.

The slurry of the electrophoretic particles was injected into an ITO cell (dimension: 40 mm×45 mm×80 um; width× length×height) having upper and lower plates, through which an electrical current may pass, and then a voltage was applied to and removed from the upper and lower plates to evaluate whether the electrophoretic particles can be utilized as a key material for the electrophoretic display device. Specific items and methods for such measurements are as follows.

(1) Measurement of Contrast

After a slurry of an electronic ink was injected between the upper and lower plates of the ITO cell as fabricated and then a voltage of +15V and −15V was applied thereto, the absolute value of the maximum of white reflectivity and the absolute value of the minimum of black reflectivity were measured. Then, the ratio between the two values was calculated by dividing one by another.

Specifically, the degree of light and shade realized by the ITO cell was measured using a luminance meter, CHROMA METER CS-100A, from KONICA MINOLTA Co. Ltd. to obtain a luminance value (L), which was then compared with that of a standard white plate made from barium sulfate (100 cd/m2) to calculate an L* value (luminance).

(2) Measurement of Response Speed

A slurry of an electronic ink was injected between the upper and lower plates of the ITO cell as fabricated and a voltage of +15V and −15V was applied thereto to measure the time required for reaching the maximum value of the white luminance and the minimum value of the black luminance, respectively.

TABLE 3

Results of Experimental Example 4

| | introduction ratio of white particles | contrast ratio | response speed (L/sec) |
|---|---|---|---|
| Example 1 | 60% | 13:1 | 20 |
| Example 2 | 60% | 14:1 | 23 |
| Example 3 | 60% | 12:1 | 20 |
| Comp. Example 1 | 60% | 12:1 | 8 |
| Comp. Example 2 | 60% | 13:1 | 5 |

As shown in Table 3, the electrophoretic display device using the electrophoretic particles of the examples may realize a contrast ratio equal to or higher than that of the electrophoretic display device using the electrophoretic particles of the comparative examples. Results of measuring the contrast ratio realized in the examples and the comparative examples are shown in FIGS. 5 to 8.

It is also found that because the electrophoretic particles of the examples neither swell in nor absorb the flowing fluid, the viscosity of the electrophoretic slurry does not really increase and thus the electrophoretic display device using the electrophoretic particles of the examples may exhibit much faster response speed than that of the comparative examples.

What is claimed is:

1. An electrophoretic particle, which comprises:
   a core part including an inorganic particle;
   a shell layer being formed on the core part and comprising a first polymeric compound containing an acrylate or vinyl repeating unit and a multifunctional acrylate repeating unit; and
   a protective layer being formed on the shell layer and comprising a second polymeric compound containing an acrylate or vinyl repeating unit and a multifunctional aromatic vinyl repeating unit.

2. The electrophoretic particle in accordance with claim 1, wherein its true specific viscosity is no more than 1.60 g/cm$^3$.

3. The electrophoretic particle in accordance with claim 1, wherein as electrophoretic particles are added to a solvent with a viscosity equal to or less than 20 cP, a change in the viscosity of the solvent is no more than 10%.

4. The electrophoretic particle in accordance with claim 1, wherein the core has a maximum diameter of 30 nm to 1 µm, the shell layer has a thickness of 1 nm to 15 µm, and the protective layer has a thickness of 5 nm to 15 µm.

5. The electrophoretic particle in accordance with claim 1, wherein the inorganic particle comprises at least one selected from the group consisting of titanium oxide, magnesium oxide, zinc oxide, calcium oxide, zirconium oxide, iron oxide, CrCu, carbon black, phthalocyanine blue, phthalocyanine green, diarylide yellow, diarylide AAOT yellow, and quinacridone, azo, rhodamine, and perylene pigment series, and Hansa yellow G particles.

6. The electrophoretic particle in accordance with claim 1, wherein the acrylate repeating unit contained in the first polymeric compound or the second polymeric compound comprises a repeating unit of Chemical Formula 1, and the vinyl repeating unit contained in the first polymeric compound or the second polymeric compound comprises a repeating unit of Chemical Formula 2:

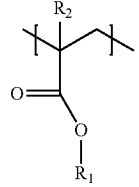

[Chemical Formula 1]

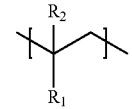

[Chemical Formula 2]

wherein, in Chemical Formula 1 and Chemical Formula 2, each $R_1$ is a C1 to C30 alkyl group, a C2 to C30 alkenyl group, a C6 to C30 aryl group, a C7 to C30 alkylaryl group, a C7 to C30 arylalkyl group, a C4 to C20 cycloalkyl group, a amide group unsubstituted or substituted with a C1 to C20 alkyl group, or a C1 to C20 alkoxycarbonyl group, and each $R_2$ is hydrogen or a C1 to C3 alkyl group.

7. The electrophoretic particle in accordance with claim 1, wherein the multifunctional acrylate repeating unit contained in the first polymeric compound comprises a moiety of a compound having at least two acrylate or methacrylate groups.

8. The electrophoretic particle in accordance with claim 1, wherein the multifunctional acrylate repeating unit contained in the first polymeric compound comprises a moiety of at least one compound selected from the group consisting of 1,2-ethanediol diacrylate, 1,3-propanediol diacrylate, 1,3-butanediol diacrylate, 1,4-butanediol diacrylate, 1,5-pentanediol diacrylate, neopentyl diacrylate, 1,6-hexanediol diacrylate, ethylene glycol diacrylate, propylene glycol diacrylate, butylene glycol diacrylate, triethylene glycol diacrylate, and tetraethylene glycol diacrylate.

9. The electrophoretic particle in accordance with claim 1, wherein the multifunctional aromatic vinyl repeating unit contained in the second polymeric compound comprises a moiety of an aromatic compound having at least two vinyl groups.

10. The electrophoretic particle in accordance with claim 1, wherein the multifunctional aromatic vinyl repeating unit contained in the second polymeric compound comprises a moiety of at least one compound selected from the group consisting of divinyl benzene, bis(vinyl phenyl)ethane, and triallylcyanurate.

11. An electrophoretic display device, which comprises:
   two substrates being opposite to each other;
   an electrophoretic part formed between the two substrates; and
   an electrophoretic particle of claim 1 located in the electrophoretic part.

12. The electrophoretic display device in accordance with claim 11, wherein the electrophoretic part comprises a microcapsule or a micro-cup.

13. A method of producing an electrophoretic particle, which comprises the steps of:
adding a first monomer mixture including an acrylate or vinyl monomer, a polymerization initiator, and a compound with at least two acrylate or methacrylate groups to a solvent having inorganic particles dispersed therein and subjecting a resultant mixture to a polymerization reaction at a temperature of 10 to 120° C. for 1 to 50 hours to form a core-shell structured particle; and
adding a second monomer mixture including an acrylate or vinyl monomer, a polymerization initiator, and an aromatic compound with at least two vinyl groups to a solvent having the core-shell structured particles dispersed therein and subjecting a resultant mixture to a polymerization reaction at a temperature of 10 to 120° C. for 1 to 50 hours to form a protective layer on the shell.

14. The method of producing an electrophoretic particle in accordance with claim 13, wherein the solvent having inorganic particles dispersed therein or the solvent having the core-shell structured particles dispersed therein may further comprise a dispersion stabilizer.

15. The method of producing an electrophoretic particle in accordance with claim 13, wherein the first monomer mixture is added to the solvent having inorganic particles dispersed therein by an amount of 0.1 mL to 3 mL at a time.

16. The method of producing an electrophoretic particle in accordance with claim 13, wherein the second monomer mixture is added to the solvent having the core-shell structured particles dispersed therein by an amount of 0.1 mL to 3 mL at a time.

* * * * *